Oct. 19, 1948.　　　　　G. S. DOMAN　　　　　2,451,541
DYNAMIC BALANCER FOR ROTOR BLADES
Filed May 24, 1945　　　　　　　　　　　　　　2 Sheets-Sheet 1
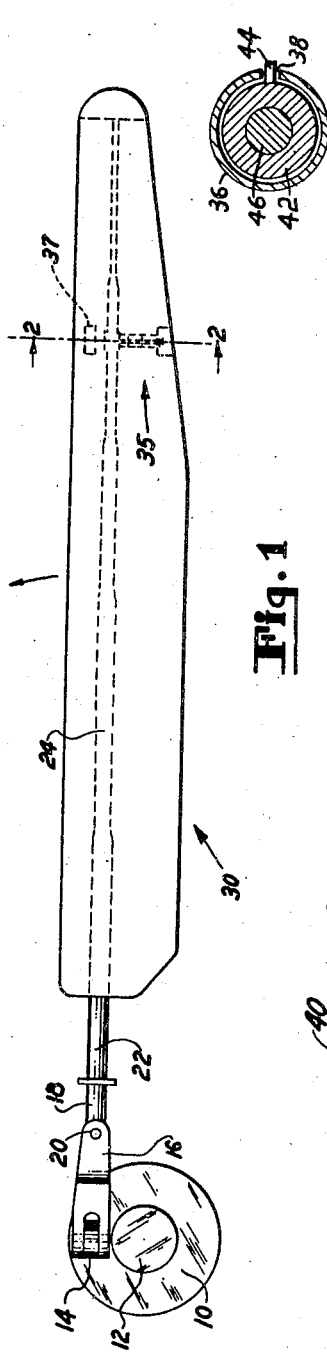
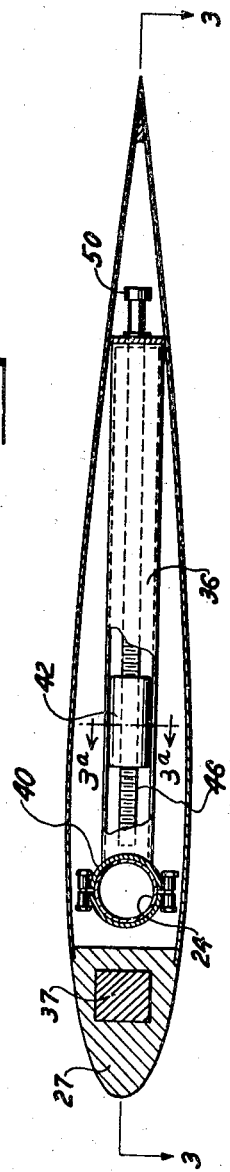
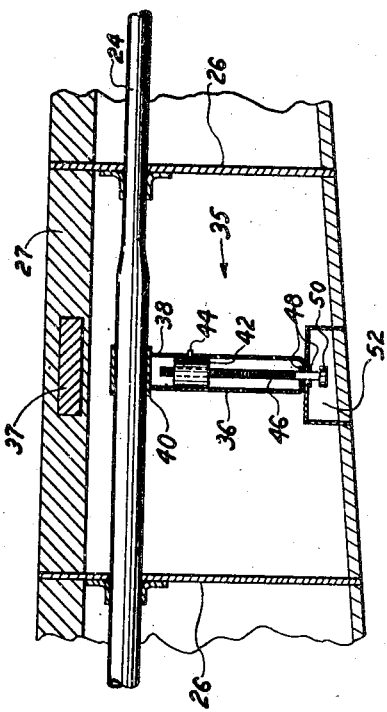
G. S. DOMAN
INVENTOR
BY *Gifford S. Holmes*
AGENT Oct. 19, 1948.　　　　G. S. DOMAN　　　　2,451,541
DYNAMIC BALANCER FOR ROTOR BLADES
Filed May 24, 1945　　　　　　　　　　2 Sheets-Sheet 2
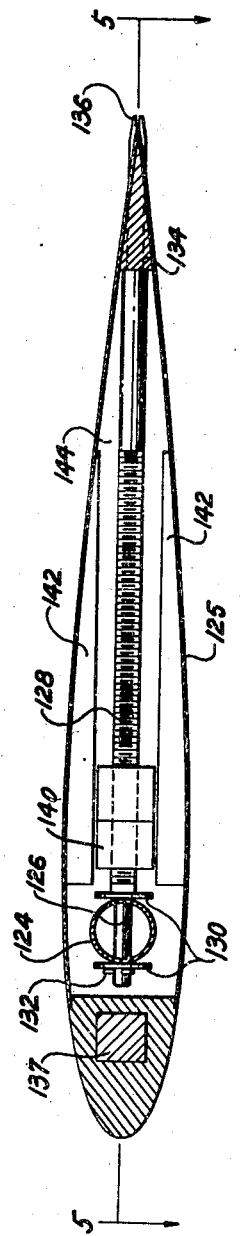
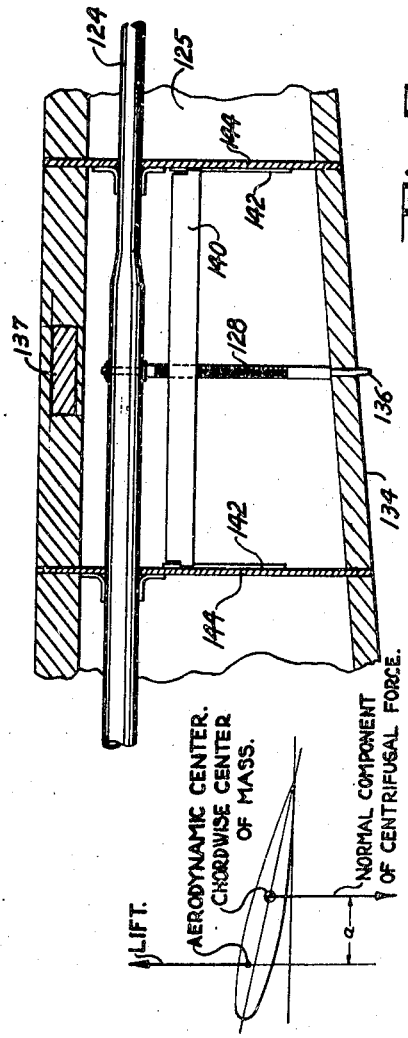
G. S. DOMAN
INVENTOR
BY *Gifford L. Holmes*
AGENT Patented Oct. 19, 1948

2,451,541

UNITED STATES PATENT OFFICE 2,451,541

DYNAMIC BALANCER FOR ROTOR BLADES

Glidden S. Doman, Stamford, Conn., assignor to United Aircraft Corporation, East Hartford, Conn., a corporation of Delaware Application May 24, 1945, Serial No. 595,605

6 Claims. (Cl. 170—159)

The present invention relates to helicopter rotors and more particularly to an improved device for balancing such rotors to have correct pitching moments under dynamic conditions, while maintaining the proper static balance.

In helicopter rotors, even very slight differences in the construction of the blades will cause them to behave differently under dynamic conditions. For example, some blades will have a tendency to ride high and thus become out of track if their lift is greater than that of other blades. In other instances, the blade will twist as it flaps in its path of revolution, and cause a greater or lesser pitch to occur which will be cyclical in nature and may result in a vibration being passed back to the rotor shaft, and thus to the craft.

The presence of chordwise unbalance in the blade, particularly trailing edge heaviness, imparts a definite instability to the control system with a tendency for the blade incidence to increase itself above the desired amount of control applied. The "over control" produces erratic flight characteristics of the aircraft.

It is an object of the present invention to provide an adjusting means for varying the dynamic chordwise balance of the blade in order to establish practical coincidence of the chordwise mass and aerodynamic centers in the region of the tip of the blade where the forces are large and highly effective in disturbing blade angle and introducing control roughness.

It is a further object, in keeping with the preceding object, to provide a simplified and readily adjustable device for correcting dynamic chordwise balance while otherwise maintaining the rotor balance.

The foregoing and other objects will be either obvious or pointed out in the following specification and claims.

This device differs from that shown in application Ser. No. 613,190, filed August 28, 1945, Means for and method of balancing rotor blades, of R. B. Lightfoot, because the balance weight device thereof produces a moment which is a direct function of the blade angle and is not affected by higher order lift variations; whereas the present device responds to such variations.

In the drawings:

Fig. 1 is a plan view of a rotor blade including my invention;

Fig. 2 is a section taken along the lines 2—2 of Fig. 1;

Fig. 3 is a section taken along the lines 3—3 of Fig. 2;

Fig. 3ª is a section taken along lines 3ª—3ª of Fig. 2;

Figs. 4 and 5 are similar to Figs. 2 and 3, but of a modification; and

Fig. 6 is a diagram.

Referring more particularly to the drawings, in Fig. 1, a hub 10 is turned by a rotor shaft 12 driven by an engine, not shown. The hub 10 carries one or more lugs 14 to which a link 16 is pivoted. A blade shank 18 is carried upon a pin 20 in the link 16. A cuff 22 is formed as part of a longitudinal spar 24 and is secured to the shank 18. The spar 24 supports ribs 26 which in turn support a relatively heavy leading edge beam 27 to form a rotor blade indicated by the reference character 30. Also secured to the spar is an adjustable structure 35 for trimming the blade for dynamic moments. The blade 30 is the type adapted for flapping up and down with the link 16, moving back and forth around the pin 20, and rotating with the cuff 22 and spar 24 upon the shank 18 under control of suitable control means, not shown.

Referring more particularly to Figs. 2 and 3, the dynamic balancer structure 35 is located in the trailing portion of the blade and comprises a tube 36 having a slot 38, which tube is secured to a short sleeve 40 that is in turn secured to the spar 24. The slotted cylinder 36 contains a weight 42 having a pin 44 which rides in the slot 38 and slideably retains the weight 42 in non-rotatable relationship to the cylinder 36. The weight 42 is interiorly threaded upon a long screw 46 which is mounted in the tube 36 for rotation but not translation by a pair of shoulders 48. The screw 46 terminates in a head 50 which is shaped to receive a tool so that the screw 46 can be turned. A flap 52 is cemented over a hole in the fabric of the blade 30 and may be removed so that a wrench may be inserted through the hole to engage the head 50 to turn the screw 46 and adjust the position of the weight 42.

A weight 37 is located in the leading portion of the blade to counterbalance the cylinder 36, screw 46, and the weight 42 when the weight 42 is at the mid-point, for example, of its travel. This will permit the center of gravity of the system to be adjusted so it is located forward of, back of, or on the center line of the spar 24 which is substantially the location of the aerodynamic center of the airfoil section.

In using the present invention, the rotor blade 30 is placed upon the hub 10 which is turned by the engine, and readings are taken (by the use of suitable instruments) of the way in which the blade 30 acts under operating conditions. For example, the blade 30 may display vibratory variations of lift loading during forward flight. This may be caused by a displacement of the chordwise mass center with respect to the chordwise aerodynamic center which will introduce pitching couple that has, among others, two undesirable effects now to be explained. First, the couple is transferred to the control as a control stick vibration and, secondly, the couple produces torsional deflection of the blade which results in an undesirable disturbance of the lift forces. The total lift force contains several vibratory components when the aircraft operates in forward flight. The flapping inertia force which may be considered applied in the chordwise line center of mass also develops such vibratory components as are required to supply the reaction to the vibratory lift components. These lift forces, and their reactions, cannot introduce a pitching couple if no moment arm is present. Coincidence of the mass and aerodynamic centers eliminates the moment arm $a$ (Fig. 6) and, consequently, eliminates the moment. As the readings vary between one blade and a second blade, for example, one of the blades can be adjusted so that its tendency to pitch and thus ride high or low in its path of revolution will be corrected. If a blades rides excessively high upon increased pitch of the blade 30, for example, the weight 42 will be adjusted toward the spar 24 so that the chordwise mass center of the blade is moved forward and, therefore, the pitch increasing couple due to aerodynamic force and the component of centrifugal force acting normal to the blade is decreased. This decreases the pitch increment due to torsional deflection of the blade and returns it to the proper lift value and position relative to the other blade or blades. Such adjustment will decrease the dynamic pitching moment of the blade because of the location of the member 35 in the trailing portion of the wing opposite the spar 24 from the leading edge beam 27 counterbalanced by weight 37. As a result, the dynamic moment acting upon the blade for flapping and pitching movements will be decreased. Inasmuch as the centrifugal pitch reducing moment of the weight 42 acting upon the blade 30 is steady and of relatively small magnitude, the effect of its being decreased can be considered negligible. Furthermore, because the mass of the counterweights is located on the chord line, any vibratory component of this centrifugal pitch reducing moment which develops with cyclic pitch change is effectively cancelled by a polar inertia moment. This, and other adjustments, can be made with the structure shown without varying the static balance of the several blades of the rotor because the longitudinal centers of gravity and pressure will not be changed.

A modification of my invention is shown in Figs. 4 and 5 in which the weight and adjusting mechanism is mounted differently, and comprises different elements for performing the same functions as discussed above in connection with the first modification.

A spar 124 has a hole passing horizontally there-through into which fits an extended end 126 of an elongated screw 128. The end 126 is secured in place by washers 130 and a cotterpin 132. The other end of the screw 128 is supported in a trailing edge piece 134 and extends externally of the blade 125. The screw 128 is provided with a kerf 136 at its exposed end, into which a tool may be inserted to rotate the screw 128. A weight 140 is guided at its ends by guides 142 carried by ribs 144 that are secured to the spar 124. When the screw 128 is rotated, the weight 140 will be moved to shift the chordwise center of gravity location for the blade 125 at the location of the weight.

The device disclosed in Figs. 4 and 5, may be adjusted in substantially the same manner as described in connection with Figs. 1, 2, and 3.

While I have shown two forms that my invention may take, it will be understood that equivalent devices will occur to those skilled in the art. For that reason, I wish not to be limited in my invention only to that form shown and described but by the scope of the following claims.

I claim:

1. A rotor blade having a longitudinal spar, a weight in the leading portion of said blade, a hollow member secured to said spar in the trailing portion of said blade, said weight and said hollow member lying on substantially the same chord of said blade, a mass positioned in said member, a screw threaded into said mass and adapted to move said mass in said member between certain limits, said member, mass and screw being counterbalanced by said weight when said mass is at a point between said limits, and means producing relative angular motion between said mass and said screw so that said mass is moved chordwise of said blade to move the center of gravity of said blade chordwise with respect to said spar.

2. A rotor blade comprising structural parts shaping the blade including a longitudinal leading edge member of substantial mass, a hollow blade portion trailing said leading edge member and terminating in the trailing edge of said blade and a longitudinal spar located aft of said leading edge member, and mechanism carried by said spar in the outer third of the length of the latter and extending aft of said spar into said hollow blade portion for adjusting the chordwise mass center of the outer portion of said blade into coincidence with the chordwise aerodynamic center thereof, said adjusting mechanism including chordwise guiding means, a mass movable along said guiding means, and a rotatable adjusting member having a screw threaded connection with said mass and operable from the exterior of said blade for adjusting said mass chordwise of said blade.

3. A rotor blade comprising structural parts shaping the blade including a longitudinal leading edge member of substantial mass, a hollow blade portion trailing said leading edge member and terminating in the trailing edge of said blade, and a longitudinal spar located aft of said leading edge member, and mechanism carried by said spar in the outer third of the length of said blade and extending aft of said spar into said hollow blade portion for adjusting the chordwise mass center of the outer portion of said blade into coincidence with the chordwise aerodynamic center thereof, said adjusting mechanism including chordwise guiding means, a mass movable along said guiding means, a screw having a threaded connection with said mass, and means operable from the exterior of said blade for effecting relative rotation between said mass and said screw.

4. A rotor blade having a leading edge member, a trailing edge member and a longitudinal spar, a pair of chordwise ribs spaced spanwise of said blade and connecting said members and said spar in a portion of said blade remote from the root end thereof, a weight carried by said leading edge member between said ribs, means for changing the location of the center of gravity of said blade chordwise either ahead of or behind said spar while the spanwise location of the center of gravity of the blade remains unchanged including a fixed mass located on the opposite side of said spar from said weight and between said ribs, said mass having means securing it to said spar including a chordwise member having a screw threaded connection with said mass for adjusting the fixed position of the latter chordwise between limits relative to said spar, said weight creating a moment about said spar equal to and opposite to the combined moment of said mass and said screw threaded member about said spar when said mass is at a predetermined point between said limits, and means accessible from the exterior of said blade for effecting relative rotation between said chordwise member and said mass.

5. A rotor blade having a leading portion, a trailing portion and a longitudinal spar, a weight in the leading portion of said blade, chordwise guiding means in the trailing portion of said blade, said weight and said guiding means being located substantially in the same chordwise portion of said blade, a mass guided on said guiding means, a screw threaded into said mass and adapted to move said mass on said guiding means between certain limits, said guiding means, mass and screw being counterbalanced by said weight when said mass is at a point between said limits, and means for moving the center of gravity of said blade chordwise including means for producing relative angular motion between said mass and said screw.

6. A rotor blade having a leading portion, a trailing portion and a longitudinal spar, two ribs spaced spanwise of said blade, a weight in the leading portion of said blade between said ribs, chordwise guiding means on confronting faces of said ribs, a mass guided on said guiding means, a screw threaded into said mass and adapted to move the latter on said guiding means between limits, said guiding means, mass and screw being counterbalanced by said weight when said mass is at a point between said limits, and means for moving the center of gravity of said blade chordwise including means for producing relative angular motion between said mass and said screw.

GLIDDEN S. DOMAN.

REFERENCES CITED

The following references are of record in the file of this patent:

UNITED STATES PATENTS

| Number | Name | Date |
|---|---|---|
| 2,048,326 | Dyer et al. | July 21, 1936 |
| 2,076,090 | Myers | Apr. 6, 1937 |
| 2,380,583 | LaCierva | July 31, 1945 |

FOREIGN PATENTS

| Number | Country | Date |
|---|---|---|
| 365,027 | Great Britain | Jan. 14, 1932 |
| 119,296 | Australia | Nov. 28, 1944 |